United States Patent
Champagne et al.

(10) Patent No.: US 10,403,945 B2
(45) Date of Patent: Sep. 3, 2019

(54) DUAL-SIDED PROPULSION BATTERY COOLANT SYSTEM

(71) Applicant: GM Global Technology Operations LLC, Detroit, MI (US)

(72) Inventors: Randall S. Champagne, Riverview, MI (US); Stephen L. Gross, Sterling Heights, MI (US); Leo F. Schwab, Fraser, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 235 days.

(21) Appl. No.: 15/596,721

(22) Filed: May 16, 2017

(65) Prior Publication Data
US 2018/0337433 A1 Nov. 22, 2018

(51) Int. Cl.
| | |
|---|---|
| H01M 10/617 | (2014.01) |
| H01M 10/625 | (2014.01) |
| H01M 10/6555 | (2014.01) |
| H01M 2/10 | (2006.01) |
| B60L 11/18 | (2006.01) |
| B60L 58/26 | (2019.01) |
| H01M 10/613 | (2014.01) |

(52) U.S. Cl.
CPC ........ *H01M 10/6555* (2015.04); *B60L 58/26* (2019.02); *H01M 2/1077* (2013.01); *H01M 10/613* (2015.04); *H01M 10/617* (2015.04); *H01M 10/625* (2015.04); *H01M 2220/20* (2013.01)

(58) Field of Classification Search
CPC ........... H01M 10/6555; H01M 10/625; H01M 10/617; H01M 2/1077; H01M 2220/20; B60L 58/26
See application file for complete search history.

(56) References Cited

U.S. PATENT DOCUMENTS

| | | | |
|---|---|---|---|
| 2014/0322582 A1* | 10/2014 | Ruter | H01M 2/1072 429/120 |
| 2016/0118701 A1* | 4/2016 | Subramanian | H01M 10/6554 429/120 |
| 2019/0044200 A1* | 2/2019 | Motoyoshi | H01M 10/6552 |

* cited by examiner

*Primary Examiner* — Muhammad S Siddiquee
(74) *Attorney, Agent, or Firm* — Harness, Dickey & Pierce, P.L.C.

(57) ABSTRACT

A vehicle battery coolant system includes a first battery module including a first plurality of cells and a second battery module including a second plurality of cells. A coolant plate is disposed between the first and second battery modules and in heat transfer relationship with the first and second battery modules, wherein the coolant plate has fluid passages therein.

3 Claims, 1 Drawing Sheet

DUAL-SIDED PROPULSION BATTERY COOLANT SYSTEM

FIELD

The present disclosure relates to battery coolant systems and more particularly to a dual-sided propulsion battery coolant system.

BACKGROUND

This section provides background information related to the present disclosure which is not necessarily prior art.

A battery cell has been proposed as a clean, efficient and environmentally responsible power source for electric vehicles and various other applications. Batteries are rechargeable and can be formed into a wide variety of shapes and sizes so as to efficiently fill available space in electric vehicles. For example, the battery cell may be prismatic in shape to facilitate a stacking of the battery cells. A plurality of individual battery cells can be provided in a battery pack to provide an amount of power sufficient to operate electric vehicles.

Battery cells are known to generate heat during operation and as a result of a charge cycle when recharging. When overheated or otherwise exposed to high-temperature environments, undesirable effects can impact the operation of the batteries. Cooling systems are typically employed to militate against the undesirable overheating conditions. The cooling systems may include cooling plates or fins that may have channels through which a coolant flows in a heat transfer relationship with the battery cells.

Conventional cooling systems have included a liquid cooling plate disposed on one side of a battery pack having a plurality of cells or cell modules for cooling that individual battery pack.

There is a continuing need for a battery cooling system that maximizes efficient cooling of the battery cells with minimum delta temperatures. Desirably, the battery cooling system and method maintains uniform surface temperatures over the battery cells and efficiently transfers heat away from the cells using liquid cooling.

SUMMARY

This section provides a general summary of the disclosure, and is not a comprehensive disclosure of its full scope or all of its features.

A vehicle battery coolant system includes a first battery module including a first plurality of cells and a second battery module including a second plurality of cells. A coolant plate is disposed between the first and second battery modules and in heat transfer relationship with the first and second battery modules, wherein the coolant plate has fluid passages therein.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 1:
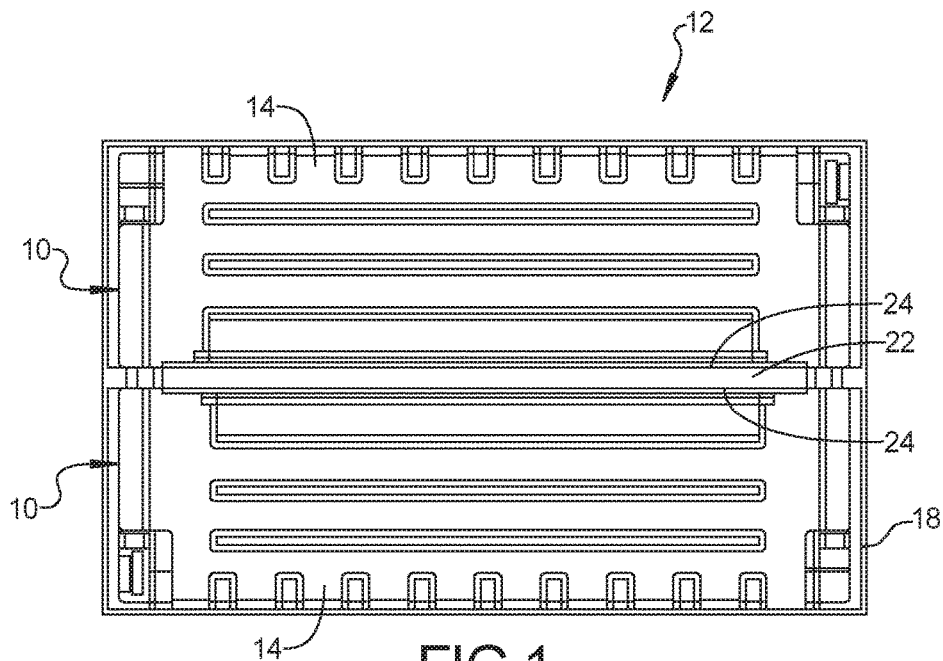
Figure 2:
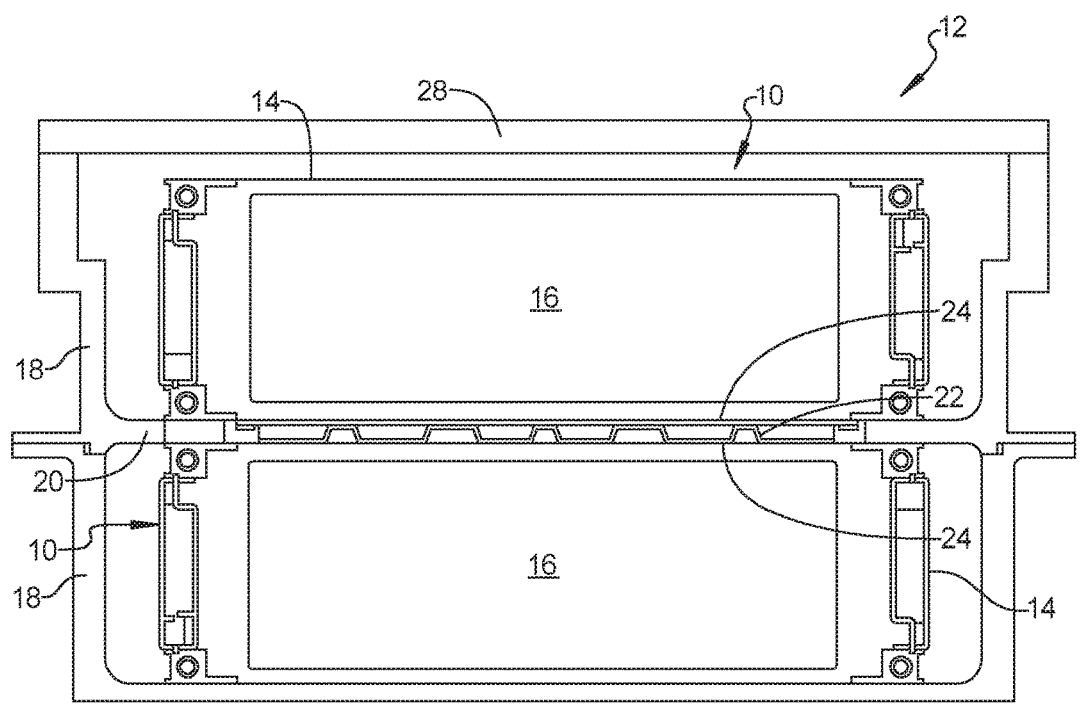

FIG. 1 is a schematic side view of pair of stacked battery modules having a cooling system according to the principles of the present disclosure; and FIG. 2 is a cross-sectional view of a pair of stacked battery modules having a cooling system according to the principles of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1 and 2, a pair of battery modules 10 of a vehicle battery system 12 is shown. The battery modules 10 each include a housing 14 and a plurality of cells 16 disposed within the housing 14. An outer case 18 can include a spacer block 20 for maintaining a spacing between the battery modules 10. A coolant plate 22 is disposed between the plurality of cells 16 of the pair of battery modules 10. A layer of thermal interface material 24 is disposed on each side of the coolant plate 22 and in heat transfer relationship with the plurality of cells 16. A lid 28 is disposed on the outer case 18.

By supporting the coolant plate 22 between the pair of cells 16, the upper battery module 10 supplies a pressure on the coolant plate 22 and thermal interface material 24 to supply a proper pressure against an upper surface of the lower battery module 10. This provides an equal pressure on the coolant plate 22 because the coolant plate 22 is compressed equally on its top and bottom surface by the compression of the thermal interface material 24. The outer case 18 provides a proper spacing between the upper and lower battery modules 10 for coolant plate compression. Uniform pressure across the coolant plate 22 is important for proper heat transfer from the battery modules 10.

The coolant system of the present disclosure utilizes a single coolant plate 22 and opposite layers of thermal interface material 24 between a pair of battery modules 10. The use of a single coolant plate 22 for cooling a pair of battery modules 10 provides a reduction in overall height of the battery system 12 of approximately 25 mm. The concept can be applied to two or more stacked battery modules 10. The coolant system of the present disclosure reduces the number of coolant plates needed and further reduces the amount of coolant needed which each result in reduced weight for the vehicle. In addition, the elimination of a coolant plate due to the shared coolant plate relationship reduces the number of coolant connections that are needed and results in lower coolant pressure due to the reduced number of coolant plates. In addition, the use of a single coolant plate between a pair of battery modules provides cell temperature uniformity due to the use of one coolant plate versus if there were 2 separate coolant plates. The present disclosure increases the efficient utilization of the coolant plate by utilizing both sides of the plate 22.

The thermal interface material 24 can be a known thermal interface material in the form of a pad. The battery modules 10 of the present disclosure can be stored below a floor of a vehicle as is known in the art.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle battery coolant system, comprising:
a first battery module including a first plurality of cells wherein the first battery module includes a first housing surrounding the first plurality of cells;
a second battery module including a second plurality of cells wherein the second battery module includes a second housing surrounding the second plurality of cells;
a coolant plate disposed between the first and second battery modules and in heat transfer relationship with the first and second battery modules, wherein the coolant plate has fluid passages therein;
a first thermal interface pad material disposed directly between and in direct contact with each of the first battery module and a first side of the coolant plate and a second thermal interface pad material disposed directly between and in direct contact with each of the second battery module and a second side of the coolant plate; and
a first outer case receiving the first battery module and a second outer case stacked vertically on top of the first outer case and receiving the second battery module, wherein the second outer case includes a spacer block that extends radially inward from a sidewall of the second outer case and supports the coolant plate between the first and second battery modules.

2. A vehicle battery coolant system, comprising:
a first battery module including a first plurality of cells wherein the first battery module includes a first housing surrounding the first plurality of cells;
a second battery module including a second plurality of cells wherein the second battery module includes a second housing surrounding the second plurality of cells;
a coolant plate disposed between the first and second battery modules and in heat transfer relationship with the first and second battery modules, wherein the coolant plate has fluid passages therein;
a first thermal interface pad material disposed directly between and in direct contact with each of the first battery module and a first side of the coolant plate and a second thermal interface pad material disposed directly between and in direct contact with each of the second battery module and a second side of the coolant plate; and
a first outer case receiving the first battery module and a second outer case stacked vertically on top of the first outer case and receiving the second battery module, wherein the second outer case includes a spacer block that extends radially inward from a sidewall of the second outer case and supports the coolant plate between the first and second battery modules, wherein a weight of the coolant plate and the second battery module is supported by the first battery module so that a substantially uniform pressure across the first and second thermal interface pads is achieved.

3. A vehicle battery coolant system, comprising:
- a first battery module including a first plurality of cells wherein the first battery module includes a first housing surrounding the first plurality of cells;
- a second battery module including a second plurality of cells wherein the second battery module includes a second housing surrounding the second plurality of cells;
- a coolant plate disposed between the first and second battery modules and in heat transfer relationship with the first and second battery modules, wherein the coolant plate has fluid passages therein;
- a first thermal interface pad material disposed directly between and in direct contact with each of the first battery module and a first side of the coolant plate and a second thermal interface pad material disposed directly between and in direct contact with each of the second battery module and a second side of the coolant plate; and
- a first outer case receiving the first battery module and a second outer case stacked vertically on top of the first outer case and receiving the second battery module, wherein the second outer case includes a spacer block that extends radially inward from a sidewall of the second outer case and supports the coolant plate between the first and second battery modules, wherein the first and second battery modules are only cooled by the coolant plate disposed between the first and second battery modules.

* * * * *